250/201 PF

United States Patent [19]

Sugiura et al.

[11] Patent Number: 4,633,072
[45] Date of Patent: Dec. 30, 1986

[54] FOCUS APPARATUS FOR ZOOM LENS SYSTEM WITH DISTANCE DETECTION

[75] Inventors: Muneharu Sugiura; Akira Tajima, both of Kanagawa, Japan

[73] Assignee: Canon Kabushiki Kaisha, Tokyo, Japan

[21] Appl. No.: 815,743

[22] Filed: Dec. 30, 1985

Related U.S. Application Data

[63] Continuation of Ser. No. 519,686, Aug. 2, 1983, abandoned.

[30] Foreign Application Priority Data

Aug. 5, 1982 [JP] Japan .................. 57-136703

[51] Int. Cl.⁴ ................................. G01J 1/20
[52] U.S. Cl. .................... 250/201; 250/201
[58] Field of Search .......... 250/201, 201 AF, 201 PF; 354/400, 401, 402, 403, 404, 405, 406, 407, 408, 409; 356/1, 4; 352/140

[56] References Cited

U.S. PATENT DOCUMENTS

| 3,972,056 | 7/1976 | Tsujimoto et al. | 250/201 |
| 4,083,057 | 4/1978 | Quinn | 354/402 |
| 4,183,639 | 1/1980 | Suwa | 354/402 |
| 4,329,578 | 5/1982 | Rosner | 250/201 |
| 4,482,235 | 11/1984 | Yasukawa et al. | 354/402 |
| 4,509,842 | 4/1985 | Taniguchi et al. | 354/402 |

*Primary Examiner*—David C. Nelms
*Assistant Examiner*—James Gatto
*Attorney, Agent, or Firm*—Toren, McGeady, Stanger, Goldberg & Kiel

[57] ABSTRACT

Focusing optics placed behind the zooms optics of a zoom arrangement are focused by computing the necessary focusing movement in response to the output of a focal length detector and an object distance detector. Comparison is made to the actual position of the focusing optics.

5 Claims, 2 Drawing Figures

FOCUS APPARATUS FOR ZOOM LENS SYSTEM WITH DISTANCE DETECTION

This is a continuation of application Ser. No. 519,686, filed Aug. 2, 1983, now abandoned.

BACKGROUND OF THE INVENTION

1. Field of the Invention

This invention relates to zoom lenses, and particularly to focusing apparatuses for lens systems having zoom members.

2. Description of the Prior Art

Most ordinary zoom lenses are focused by adjusting a focusing lens in front of the zoom variator lens so as to maintain a focus once it is established. Incorporating automatic focusing or AF devices in such zoom lenses causes problems in that the first or front lens members are generally heavy and the automatic operating mechanism must apply a great deal of power to move these members. Therefore, in automatically focused zoom lenses designers prefer to focus with a rear lens member, or the least bulky lens member possible. On the other hand, rear focused zoom lenses require changing the position of the focusing member when the focal length of the entire system is changed during zooming in order to continue focusing on one and the same object distance. This makes it necessary to undertake whatever measures are suitable for detecting the change in the focal length for each shift in the zoom position.

When adjusting the focus with lenses in the rear of a zoom lens assembly, or with lenses that are nearer to the photosensitive material, a number of new factors must be taken into consideration.

For example, automatic focusing devices may be divided into two classes. One of these uses an optical system separate from the photographic lens in routing light from the object to be photographed to a light sensor on whose output the object distance is evaluated. This is the so called outside-the-lens type. In the other, the light passing through the photographic lens is split off and directed toward the light sensor whose output signal is used to determine the object distance. This is called the through-the-lens (TTL) automatic focusing (AF) type. The latter avoids parallax between an image of an object in the picture frame and an image of the same object in the viewfinder. The latter system is generally the preferred type of focusing.

However, even the TTL-AF system raises problems as to what part of the zoom lens to use in measuring the object distance, or where to position the diaphragm.

For example, such difficulties would arise with video camera, cine cameras, or other similar photographic instruments which operate continuously when the focusing system adjusts the lens nearest to the object to be photographed, i.e., the front most member in the entire system. The electrical energy necessary to drive the bulky front focusing member places a severe drain on the largely limited energy store.

Also, the positioning of the diaphragm relative to the range finding element constitutes another important factor in determining how to control the operation of the diaphragm and in limiting the space which the range finding element occupies. When the diaphragm lies between the focusing lens member and the range finding element, the light rays reflected from the object and entering the focusing member may be mutilated depending upon the size of the aperture before reaching the range finding element.

Moreover, a TTL-AF range finding system of the above type operates with light from the object through the diaphragm aperture. It is thus susceptible to the depth of field as the latter varies with the diaphragm opening. More specifically, with a small aperture, the depth of field is relatively large. Thus, even if the position of the focusing lens deviates more or less from a sharp focusing position, the output signal from the range finding element falls within the limits representing an acceptable range of image sharpness. On the other hand, when the aperture is relatively large, the depth of field is shallow. Thus, a slight deviation from sharp focus results in a large variation in the range finder output signal beyond the band of values for sharp focus. Thus, because the light rays reaching the range finding element through the diaphragm affect the depth of focus, the accuracy of the range finder output signal may decrease.

SUMMARY OF THE INVENTION

An object of the present invention is to obtain a focusing system in which range-finding is performed by a light bundle from an optical system arranged in a photographic optical system including a zoom lens optical system in the rear of the zoom lens optical system, or on the photosensitive material side thereof so that a lesser driving energy suffices, and to provide a focusing apparatus for a zoom lens with a range finding element arranged on the object side of a diaphragm whereby a light bundle incident upon the range finding element is not influenced by the depth of field.

Another object of the present invention is to provide a focusing apparatus applicable to a photographic lens provided with a zoom lens system to form an optical system of which the in-focus condition is caused to change by zooming.

In this connection it should be explained that in general as the focal length of the entire system varies, the total axial movement of the focusing lens member for given object distance range varies from a small value for the shortest focal length positions to a large value for the longest focal length positions. Such differentiation of the speed of movement of the focusing member with the focal length makes it very difficult to control the operation of the focusing member in relation to the zooming operation. The present invention is to provide a focusing apparatus having focal length detecting means arranged in a portion of the zoom lens to cooperate with an oeprating mechanism for said zoom lens to detect the focal length of said zoom lens, and object distance detecting means arranged in one of the air separations of the optical system ahead the diaphragm of the zoom lens, or outside the optical system of said zoom lens to detect the object distance, wherein the output signals from said focal distance detecting means and said object distance detecting means are used in controlling the movement of one or all of the lens members which are arranged in rear of the zoom members to effect focusing whereby the above-described problems can be solved.

DESCRIPTION OF THE PREFERRED EMBODIMENTS

Figure 1:
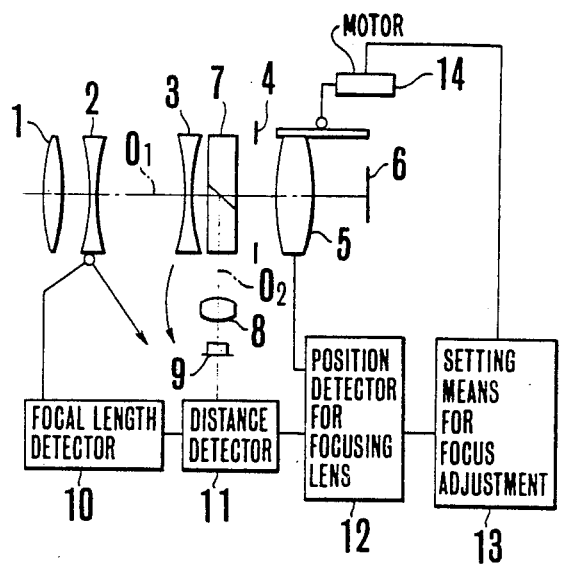
FIG. 1 is a schematic view, partly in block form, of a first embodiment of the invention.

FIG. 1 illustrates a first embodiment of the focusing apparatus according to the present invention applied to the above-described TTL-AF type system. In the drawing, numerical character 1 denotes a fixed focal lens group.

A zoom lens optical system includes a variator 2 and a compensator 3. A diaphragm device is positioned before a focus adjusting lens group 5.

Numeral 6 denotes a focal plane which, where the apparatus is applied to a single lens reflex camera, represents a photosensitive surface.

A light splitter 7 such as a half-mirror conducts a light beam for performing distance measurements. The light splitter 7 directs a portion of the light coming from an object to be photgraphed and entering through the zoom members 2 and 3 from a photographic light path $O_1$ to a range finding light path $O_2$ to serve as range finding light beam. The range finding light beam passes through a collection lens 8 to a range finding element 9. Arranging the light splitter 7 ahead the diaphragm 4 makes it possible to remove the influence of the depth of field that would occur with a diaphragm arranged otherwise as described in connection with the prior art.

A focal length detector detects 10 detecting the change of focal length resulting from the axial reciprocal movement of the variator 2 as illustrated by a curve (a) in the drawing when zooming. A signal from the focal length detector 10 represents the distance the variator 2 has moved as measured from the near or far terminal end of the total movement of the variator 2.

A distance detector 11 responds to an electrical signal converted from the light beam from the object by the range finding element 9 and the signal from the focal length detector 10 producing a signal representing the object distance.

Focusing lens position detector 12 produces an output signal representing the position of the focus adjusting lens 5 by detecting what point in position the focus adjusting lens 5 is taking in between the near and far ends of the total axial movement of said lens 5 and producing an output in the form of an electrical signal. For this purpose, a holder (not shown) for the lens 5 is provided with a slider (not shown) moving on a code (gray code) arranged on a lens barrel (not shown) so that the position of the lens 5 is converted to an electrical signal.

Focus adjusting amount setting means 13 computes the amount of movement of said focus adjusting lens 5 in response to the distance information from said distance detector 11 and the position information from said focusing lens position detector 12 computing the distance from the as-detected position of the lens 5 to an in-focus position. The output signal from said focus adjusting amount setting means 13 is produced in the form of pulses with a predetermined frequency or representing the period of actuation of an electric motor 14 so that the movement of the lens 5 to the point in position of sharpest focus, or to a region of sharp focus is made possible by the motor 14 and a rack and pinion (not shown).

Figure 2:
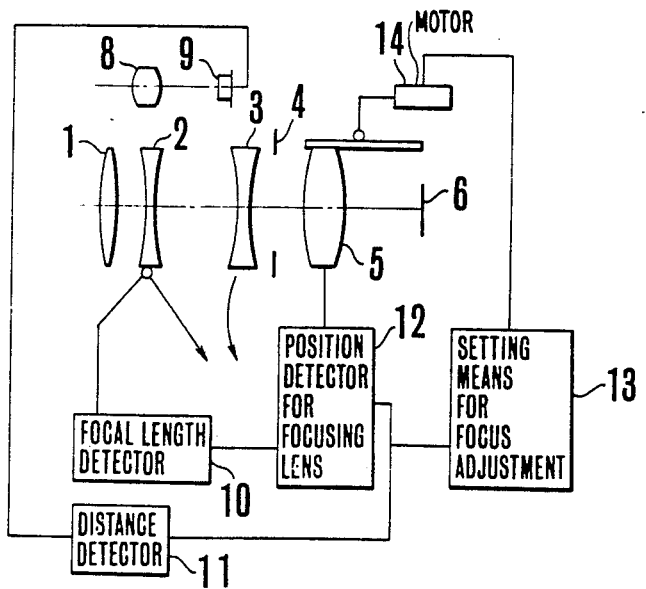
FIG. 2 is similar to FIG. 1 except that a second embodiment of the invention is illustrated.

FIG. 2 schematically illustrates another embodiment of the focusing apparatus according to the invention applied to an optical system where light from an object to be photographed enters lens groups 1, 2 and 3 and the front side of a diaphragm 4 and through a focus adjusting lens group 5 on the rear side of the diaphragm 4 reaches a focal plane 6 where an image of the object is formed. Also light from the object passes through a range finding lens group 8 arranged outside the zoom lens to a photosensitive element 9.

Object distance information from object distance detector 11 including the aforesaid photosensitive element 9, information from focal length detector 10 for detecting the focal length from the amount of movement of its variator 2 or from the present position, and an information from focusing lens position detector 12 for detecting the present position of the focus adjusting lens group 5, are used to produce a signal representing the focusing movement of the lens group 5 at an output of focus adjusting amount setting means 13. In response this output signal, driving means 14 moves the lens group 5 to the in-focus position.

As described above, the focusing method for zoom lenses according to the present invention involves detecting the object distance at a point ahead the diaphragm or outside the zoom lens. This offers the advantage that despite the size of aperture of the diaphragm changing, without being susceptible to it at all, distance detection can be carried out with high accuracy. The information from the distance detector and the information representing the focal length in the present zooming position are incorporated into the determination of the amount of movement of the focus adjusting lens group which lies in rear of the zoom lens system. Therefore, the system is usually small in bulk and light in weight, thereby offering the additional advantage that the focusing operation can be performed easily with high accuracy.

It is to be noted that the focusing of zoom lenses according to the present invention is applicable to any zoom lenses, provided the zoom type is such that there is a diaphragm and the varifocal optical system is followed by a focusing lens group.

Though the present invention has been described in connection with the illustrated embodiments where the focusing lens group is arranged not only in the rear of the varifocal optical system but in rear of the diaphragm, it be permissible that the focusing lens group is in front of the diaphragm, provided that it is in rear of the varifocal optical system.

It is also to be noted that the focusing lens group is not necessarily comprised of all the members that follows the varifocal optical system, and may be partly moved to focus.

What we claim:

1. A focusing apparatus for a zoom lens system comprising:
   (a) a zoom lens optical system having an object end and image end and defining an optical axis;
   (b) a focusing optical system arranged behind the image end of said zoom lens optical system for adjusting the focus;
   (c) means for detecting focal length information by zooming of said zoom lens optical system;
   (d) distance measuring means for measuring an object distance, said distance measuring means having a range finding element at a position displaced from the optical axis of said zoom lens optical system;
   (e) means receptive of an output signal from said focal length information detecting means and an output signal from said object distance measuring means for computing an amount of movement of said optical system for adjusting the focus to an in-focus position; and (f) means for driving said focusing optical system on the basis of the signal of said computing means.

2. A focusing apparatus according to claim 1, further including:

means for detecting the distance which said focusing optical system has moved from a predetermined start point in a range of movement of said focusing optical.

3. A focusing apparatus for a zoom lens system comprising:

(a) a zoom lens optical system having an optical axis;

(b) an optical system for focus adjustment arranged in rear of said zoom lens optical system;

(c) means for detecting focal length information by zooming of said zoom lens optical system;

(d) distance measuring means for measuring an object distance, said distance measuring means having a range finding element arranged on an optical axis coinciding with the optical axis of said zoom lens otpical system at at least one point;

(e) means receptive of an output signal from said focal length information detecting means and an output signal from said ojbect distance measuring means for computing an amount of movement of said optical system for focusing adjustment to an in-focus position; and (f) means for driving said optical system for focus adjustment on the basis of the signal of said computing means.

4. A focusing apparatus as in claim 3, wherein said range finding element incudes a light splitter along the optical axis of said zoom lens optical system for directing light away from the optical system along the optical axis of said range finding element, and detecting means in the path of the light directed out of the optical axis of said zoom lens optical system.

5. A apparatus as in claim 4, wherein said distance measuring means further includes a lens in the path between said beam splitter and said detector.

* * * * *